United States Patent Office 3,324,055
Patented June 6, 1967

3,324,055
ABRASION RESISTANT COATING OF ORGANIC POLYMER, INORGANIC POLYMER, AND MONOMERS REACTIVE THEREWITH
Alvin M. Marks, 166—35 9th Ave., Beechhurst, N.Y. 11357, Mortimer M. Marks, 166—25 Cryders Lane, Whitestone, N.Y. 11357, and Charles Lee Wilson, Springfield Gardens, and Betty Lou Orofino, Astoria, N.Y.; said Wilson and said Orofino assignors to said Alvin M. Marks and said Mortimer M. Marks
No Drawing. Filed Feb. 15, 1963, Ser. No. 258,918
8 Claims. (Cl. 260—17)

This invention relates to hard surface coatings for plastics and other surfaces, and particularly those having utility for the protection of the surfaces of transparent sheets or optical elements from weathering and abrasion.

An object of this invention is to provide a hard coating which is thin, uniform and substantially free from light scatter.

Another object of this invention is to provide hard coatings have intrinsic adhesion by chemical bond to glass or plastics such as cellulose acetate, polymethyl methacrylate, polyallyl diglycol carbonate, and the like.

Another object of this invention is to provide a coating having a hardness lying between the hardest commercial plastic which presently is polyallyl diglycol carbonate, and glass.

Another object of this invention is to provide a coating which cures in a relatively short time and at low temperatures.

Another object of this invention is to provide a hard coating which is compatible with light absorbers such as soluble dyestuffs, or with pigment suspensions.

Still another object of this invention is to provide a hard coating which is possessed of sufficient flexibility and adhesion, resistance to moisture and lack of shrinkage during cure, such that the coated device may be flexed and will not craze under a variety of weathering conditions.

Another object of this invention is to provide an inorganic-organic polymeric structure having the aforementioned properties.

Still another purpose of this invention is to provide a hard surface coating for stabilized polarized films.

A feature of this invention is a process employing an intense shock of radiant energy to heat and catalyze a surface coating to rapidly harden it.

An object of the present invention is to harden a surface coating rapidly upon a thin plastic lens, without distortion.

The crosslinking reaction of silica with polyvinyl alcohol or polyvinyl butyral, was disclosed in U.S. Patent No. 2,432,113, issued to Alvin M. Marks et al. on Dec. 9, 1947.

In the prior art, various combinations of siliceous polymers and organic polymers were proposed, for example, in Patent Nos. 2,404,357, 2,440, 711, 2,404,426, and 2,925,622.

In the Patent No. 2,432,113 to Alvin M. Marks et al., structural stability was achieved by compacting the structure by employing a stretch-crystallized polyvinyl silicate compound. The crystalline "iodoalkane silicate" was prepared by first stretch-crystallizing the vinyl polymer containing hydroxyl groups, and then impregnating the crystalline structure with a reactive silica compound and iodine utilizing a swelling solvent. The structure was subsequently solidified by heating to evaporate the solvents. A product was obtained which was a thin, hard, insoluble crystalline film firmly attached to a support, optically suitable for use as a polarizing element.

Compositions of the prior art sought to attain a hard surface stable coating which could be applied in the form of a fluid and hardened to form an amorphous (non-oriented) film. However, organic and siliceous polymers tend to form randomly oriented submicroscopic crystallites which produce localized shrinkage within the coating. Films produced from combinations of polyvinyl alcohol, or its homologues, and the silicates, are usually water absorbent. The crystallites form in the course of time, on drying, heating, or prolonged exposure to weathering and humidity, with a resultant crazing and separation of the film from the substrate.

These difficulties occurred in varying degrees with all of the combinations of organic and siliceous polymer combinations investigated, particularly when the silica content necessary to achieve hardness exceeded about 40% or more.

Our investigations show that the polyvinyl acetals, particularly medium and high viscosity polymers comprising polyvinyl formaldehyde and polyvinyl acetaldehyde, withn 40–70% $SiO_2$, and celulose acetate with up to 94% $SiO_2$, have outstandingly superior characteristics. However, even with the best of such combinations, there was moisture absorption and subsequent degradation of the coating.

Compositions formulated according to this invention have overcome the difficulties with prior art materials.

Compositions of the present invention initially include a monomeric substance with the organic and inorganic polymer, which then polymerizes or interpolymerizes in situ to form a non-crazing water impermeable hard adhesive coating.

Many monomeric substances known to those skilled in the art, may be used in compositions of this invention. Examples of such monomeric materials are: methyl methacrylate, polyacrylic acid, allyl diglycol carbonate, and other similar or homologous monomers. Certain of these monomers are initially water-compatible and may be used in the solutions of this invention which tolerate water-compatible substances.

A water-soluble dyestuff such as Naphthol Green, may be dissolved in certain of the compositions of this invention, to provide a coating which transmits visible light and absorbs ultraviolet and infrared light. The initially water-soluble coating composition dissolves a water-soluble dyestuff and forms, upon curing, a water-insoluble hard surface coating having the optical characteristics of the dye.

It is not fully understood why the monomer imparts the non-crazing and water impermeable characteristics to the coating. However, it is known that many amorphous polymers undergo local crystallization to form local crystallites which are randomly oriented. Crystallization causes localized shrinking. Amorphous regions comprise polymer chains fringing from the tightly packed crystallized regions. The amorphous regions comprise polymer chains which are not as closely packed as the chains in the vicinity of the crystallites. These physical phenomena may account for the moisture absorption, crazing and separation of film from the substrate, in the compositions of the prior art.

The monomer may condense in a chemical reaction with the inorganic and organic polymer. Local crystallization and shrinkage may be prevented by rendering the structure aperiodic. Alternatively, the monomer may be retained in the remaining amorphous regions and act to suspend the crystallites in an amorphous solid polymeric solution formed from the monomer.

The water-impervious amorphous polymerized monomer prevents penetration of moisture to the suspended crystallites within the structure which it thereby strengthens. The high proportion organic-inorganic crystallites in an amorphous polymeric solid solution produce a hard coating. The crystallites are transparent and, in any event, are too small to cause light scatter.

The preferred monomer materials utilized for coating of this invention are water resistant or repellant after they have polymerized. Water is thus prevented from entering into contact with the organic-inorganic polymer, which would cause a weakening of the structure.

Whatever the explanation, compositions according to this invention comprise the following compatible materials in the given proportions:

GENERALIZED EXAMPLE (a) organic reactive polymer (3–50%).
(b) inorganic reactive polymer (30–94%).
(c) a monomer which subsequently polymerizes and which is capable of reacting with (a) and/or (b) (3–40%); or a cross-linking agent (3–40%).
(d) (optional) a dyestuff or finely divided pigment having a particle size not exceeding 50 m$\mu$, and averaging 10 m$\mu$.

In the generalized example given above a suitable reactive linear high molecular weight organic polymer (a) may comprise polyvinyl alcohol, polyvinyl alcohol acetate copolymer, polyvinyl formal, polyvinyl acetal, polyvinyl butyral, polyvinyl alcohol pyrollidine copolymer, partially hydrolyzed copolymer of vinyl acetate and acrylonitrile, cellulose acetate, or the equivalents.

These polymers and copolymers have reactive side groups comprising hydroxyl groups, but reactive side groups such as amino or halogen may be substituted.

In the generalized example given above it will be understood that the inorganic polymer (b) may be a siloxane or polysilicate such as may be prepared as described in Example 1.

In connection with the inorganic reactive polymer (b) while we prefer a siloxane, or polysilicate, other homologues which exist among related inorganic materials may be employed. Amongst these are the polytitanates, polystannates, polygermanates, polyvanadates, polyzirconates, polyphosphates and the like. In some cases mixtures of these are preferable, for Example 5 to 10% intermixed polytitanate with the polysilicates is less water permeable than the polysilicate alone.

In most cases it will be preferred to utilize inorganic polymers derived from alkyl inorganics forming a poly-R-ate where R is from the group comprising silicon, titanium, germanium, zirconium, phosphorous and the like.

Such components (b) comprising alkyl inorganic polymers must, of course, be utilized with components (a) and/or (c) which have side groups capable of interacting therewith as will be understood by those versed in the art.

In our copending application Ser. No. 233,417, combinations of light absorbers are disclosed which are compatible with non-water solvent system containing pigments suspended in nitrocellulose.

We have discovered that certain of the formulations according to this invention, as in Example 3 herein, are compatible with such light absorbing compositions, and when coated upon clear glass, render the glass useful as a light absorbing sheet having ultraviolet and infrared absorption, and having a predetermined transmittance in the visible; grey, green or other color, as required.

This invention includes combinations of hard surface coatings, and optically absorbing soluble ultraviolet absorbers and dyestuffs with or without finely divided pigments in suspension, as disclosed in our copending application Ser. No. 233,417. Thus we provided a "hard surface optical coating" which is defined as a hard, protective surface coating having specific optical absorption characteristics. The hard surface optical coatings may be applied to glass or plastic sheets, or to sunglass or ophthalmic plastic lenses. These hard surface optical coatings are particularly useful for application over polarized film, preferably produced in accordance with the copending application Ser. No. 780,580, which describes the manufacture of an iodoalkane silicate polarized film. These polarized films comprise a continuous crystalline film intrinsically adhered to a glass or plastic surface. Since the hardenable coatings herein disclosed initially contain reactive silica, these coatings are capable of forming an intrinsic bond with the polarizing film.

When coated over polarized films intrinsically adhered to the concave surface of glass or plastic lenses, the hard surface optical coatings of this invention adhere intrinsically to the polarized film surface. The polarized lens is then protected against abrasion and weathering, and provided with the requisite optical absorption properties.

The following are examples of compositions, according to this invention.

In the following examples a hydrolyzed tetraalkyl orthosilicate solution is utilized which contains in solution a maximum proportion approximately 25% of polysilicate polymer (or polysilicic acid) calculated as $SiO_2$. The instructions for the preparation of such a solution are given in Example 1 which follows:

EXAMPLE 1.—PREPARATION OF POLYSILICATE POLYMER SOLUTION

| | Parts by weight |
|---|---|
| $H_2O$ plus 1%–39% HCl | 15 |
| Tetraethyl orthosilicate | 85 |
| | 100 |

With this solution the tetraethyl orthosilicate is hydrolyzed by the addition of acidified water in stoichiometric proportions, such that the water is entirely utilized in the reaction. What remains is an inorganic polysilicate polymer dissolved in ethyl alcohol in a concentration of 24.5%.

In the prior art, concentrations not exceeding 15% polysilicate were achieved, because it was thought necessary to employ additional amounts of alcohol to effectuate the reaction by the mutual solution of the water and the tetraethyl orthosilicate. These are ordinarily immiscible in the approximately stoichiometric proportions which we utilize in this example. We have found, however, that approximately stoichiometric proportions of slightly acidified water and tetraethyl orthosilicate may be reacted completely if the components are subjected to violent agitation by rapid mechanical vibration (for example, the mixture may be placed in a closed jar, in a paint shaker) so that sufficient miscibility is achieved to start the reaction—whereafter it proceeds to completion, forming a completely clear solution.

The mixture is agitated for about 5 minutes until a clear solution is formed. During the agitation stage the solution rises in temperature to about 60° C. This temperature is then maintained for about one hour thereafter by placing a closed jar containing the solution in the air oven at 60° C. The solution is then allowed to cool to room temperature and cooled further to 10°–15° C. in a refrigerator, in which it may be stored and used within 4 or 5 days.

By this means we achieve a concentration of almost 25% polysilicate in a solution of ethyl alcohol only.

If required, the solution may now be further concentrated by vacuum distillation to produce still thicker films.

Compositions prepared by these concentrated polysilicate solutions have a high solids content which now permit the production of comparatively thick films. The solvent for these polysilicate solutions is an alcohol, there being little or no water present, which is an advantage in increasing the stability of these solutions, and aiding their compatibility with certain materials such as nitrocellulose, which are alcohol tolerant, but incompatible with water.

The hydrolyzed tetraethyl orthosilicate prepared according to this example comprises two or more monomeric molecules joined together by the elimination of adjacent ethyl groups, which join with hydroxyls and become alcohol. The silicon atoms are joined by oxygen bridges and surrounded by reactive ethyl groups. These may further react splitting off more alcohol, polymerizing, interpolymerizing or crosslinking with other materials, as hereinafter described. A linear polymeric inorganic chain known as a siloxane may also be formed.

The polymer solution, the silica solution, the monomer solution, and the dyestuff solution, if any, are then blended in suitable proportions such as are given by way of instruction in the Examples 2, 3 and 4 which follow. The monomer copolymerizes with the silica and the polymer, and possibly with the dyestuff, if present, to form an interpolymeric or interlinked complex.

Example 2 shows a clear hard surface coating for cellulose acetate, polymethyl methacrylate, and other surfaces.

EXAMPLE 2

Solution 1A:
   20% cellulose acetate (Eastman 398–10) in acetone _____ 20
   Acetic acid _____ 80
                                                               100

Solids: 4% cellulose acetate.

Solution 1B:
   Hydrolyzed tetraethyl orthosilicate (25% $SiO_2$) as per Example 1 _____ 55
   Acetic acid _____ 45
                                                               100

Solids: 13.75% $SiO_2$.

Solution 1C:
   Methyl methacrylate monomer.

Solution 1D:

| Materials | | Solution | Solids | Percent Solids |
|---|---|---|---|---|
| Initial | Final | | | |
| 1A | Cellulose acetate | 22 | 0.88 | 5.6 |
| 1B | Silica | 73 | 10.0 | 63.0 |
| 1C (monomer) | Methyl methacrylate (copolymer with). | 5 | 5.0 | 31.4 |
| Totals | | 100 | 15.88 | 100.0 |

Percent solid in total solution=15.88%.

Example 3 shows another clear hard surface coating formula. It may be used as a hard surface coating for polarized lenses, particularly for those which comprise a polarized film of crystalline iodoalkanesilicate adhered to a lens surface. The coating may also be used as a hard surface coating for glass. This hard surface coating is compatible with non-water soluble materials, such as nitrocellulose, which may contain suspended pigments, and with soluble ultraviolet absorbers and dyestuffs to give the specific optical absorption characteristics required, as described in copending application, Ser. No. 233,417.

EXAMPLE 3

Solution 2A:                       Solution
   Polyvinyl acetaldehyde "Alvar 7/70" _____ 6
   Polyvinyl formal "Formvar 7/70" _____ 4
   Acetic acid _____ 90
                                                               100

Solution 2B:
   Hydrolyzed tetraethyl orthosilicate (25% $SiO_2$) as per Example 1.

Solution 2C:
   30% methyl methacrylate monomer in n-butanol.
   30% methyl methacrylate monomer in n-butanol.

Solution 2D:

| Materials | | Solution | Solids | Percent Solids |
|---|---|---|---|---|
| Initial | Final | | | |
| 2A | Polyvinyl acetaldehyde. Polyvinyl formal | 65 | {3.9 / 2.6} 6.5 | 41 |
| 2B | Silica | 25 | 6.25 | 40 |
| 2C (monomer) | Methyl methacrylate (copolymer with). | 10 | 3.0 | 19 |
| Total | | 100 | 15.75 | 100 |

Percent Solids in total solution=15.75%.

Example 4 shows a hard surface optical coating formula for coating glass, polarized films and the like. In this example a water soluble dye such as Naphthol Green is employed. The solution is initially compatible with water. Upon hardening, the water-compatible coating and the included dyestuff become water-insoluble.

This hard surface optical coating film will, for example, form a film .00045″ thick which is smooth, hard and adherent. The coating is light green in color and is a strong absorber for ultraviolet and infrared light in the regions given. Such an optical coating is useful for sunglass and opthalmic lenses, visors, windows and the like.

The following table shows the wavelength versus optical transmittance characteristic for the coating of Example 4:

Wavelength, mm.                     Transmittance
   300 _____ 0.
   350 _____ 1.5
   400 _____ 2
   450 _____ 12
   500 _____ 40
   550 _____ 49
   600 _____ 19
   650 _____ 3
   700 _____ 2
   750 _____ 1.5
   800 _____ 4
   850 _____ 15
   900 _____ 44

EXAMPLE 4

Solution 3A:
   Polyvinyl alcohol acetate copolymer [1] _____ 250
   Ethanol _____ 225
   n-Propanol _____ 225
   Distilled water _____ 300
                                                              1000

[1] Polyvinyl alcohol acetate copolymer—45% hydrolyzed (Shawinigan D381).

This solution contains 25% solids.

Solution 3B:
   Hydrolyzed tetraethyl orthosilicate as per Example 1 (approximately 25% $SiO_2$) _____ 50
   Acetic acid _____ 50
                                                              100

This solution contains 12.5% $SiO_2$.

Solution 3C:
   Napthol Green B, 5% in distilled water.

Solution 3D:
   Allyl diglycol carbonate monomer.

Solution 3E:

| Materials | | Solution | Solids | Percent Solids |
|---|---|---|---|---|
| Initial | Final | | | |
| 3A | Polyvinyl alcohol acetate copolymer | 33.3 | 8.33 | 42 |
| 3B | Silica (as SiO²) | 33.3 | 8.33 | 42 |
| 3C | Naphthol Green B | 31.8 | 1.60 | 8 |
| 3D (monomer) | Allyl diglycol carbonate | 1.6 | 1.60 | 8 |
| Total | | 100.0 | 19.86 | 100 |

Total solids in solution=19.86.

The coatings in Examples 2, 3 and 4 were rated on a relative scale for abrasion resistance utilizing standard abrasive eraser to mar the surface by rubbing.

The following relative scale of abrasion resistance was adopted:

*Relative scale of abrasion resistance*

Glass ------------------------------------- 0
Polyallyl diglycol carbonate sheet -------- 3
Polymethyl methacrylate polymer ----------- 6
Cellulose acetate ------------------------- 10

On this scale the formula in Example 2 rates 1, that is almost as hard as glass; the formula in Example 3 rates 1.5 substituting allyl diglycol carbonate, while with methyl methacrylate as given in the rating is 3.

While allyl digylcol carbonate may be preferred for abrasion resistance in certain cases, on the other hand the methyl methacrylate compositions harden more rapidly at lower temperatures and shorter times. It may thus be observed that while a variety of monomers might be employed, certain of these are specifically preferred. A choice is made by selecting the desired qualities and arriving at the best compromise; for example, hardness, abrasion resistance and short curing time. Many of these properties can be optimized for example, by mixing different monomers to secure the desired combination of properties. Examples given are not limitative, but are by way of illustration.

Further modification may be made by noting that in Example 4, for example, satisfactory results are obtained without the monomer by the use of the Naphthol Green B dyestuff alone. This dyestuff appears to perform a function similar to that of the monomer in that it crosslinks with the other components.

Further, the organic monomer may be replaced with an inorganic monomer. For example, a small proportion of an alkyl titanate may be used in place of the monomers suggested above. Also a polytitanate-polysilicate solution may be used in place of the polysilicate solution only the polytitanate has the tendency to gel when formed by itself in an alcohol solution as above noted in Example 1 for the polysilicate. However, by including up to 10% of an alkyl titanate along with the alkyl silicate, a combined polysilicate-polytitanate mixture may be realized.

The hard surface coatings may be conveniently applied to flat or curved surfaces by the spin coating technique described in our U.S. Patent No. 2,632,725. This technique is particularly suitable for curved surfaces. However, other well known coating techniques may be employed. For example, in the coating of rolls or cellulose acetate film the hard surface coating may be applied by a roller coating technique. Alternatively, a dipping technique may be employed.

After the coating has been applied, it may be dried at 55° C. for one hour, 68° C. for four hours, and then 100° C. for one-half hour or 120°–140° C. for two minutes.

In accordance with the generalized example given above, the formulae in the examples given may be varied within certain limits.

In Example 1, the percent silica in the solution may be increased to, for example, 50% by evaporation of the alcohol as by vacuum distillation.

In Examples 2, 3 and 4, the solids composition may be substituted with equivalents and varied within the ranges of percentage given for each constituent in the generalized example.

In the application of heat-hardened coatings to the surface of thin plastic lens blanks (usually cast polyallyl diglycol carbonate), the coatings must be hardened by heating for an adequate time at a suitable temperature, without distorting the substrate lens upon which the coatings are applied.

We have discovered a novel "heat-shock" method, employing an intense beam of radiant energy to heat, react and harden the coating while leaving the substrate cool and undistorted. The process is particularly effective when applied to a heat-hardenable optical coating which absorbs predetermined wavelength of light, usually in the ultraviolet or infrared region.

It is our understanding that the intense radiant energy facilitates the hardening reaction; not only by an internal temperature rise in the coating, but by the catalytic interaction of light photons with the coating, the hardening reaction thereby occurring with minimum time and a lower temperature than with heat alone.

In practicing the "heat-shock" technique one may employ a 500–1500 watt "sungun" (a tungsten filament in an iodine atmosphere mounted in a reflector) to project an intense focussed light beam of the order of .1 to 10 gram calories per centimeter square at a distance of about 15 cm. from the coated lens. With an exposure of about 0.1–10 sec., a thin plastic supporting lens (1–2 mm. thick) does not distort appreciably, yet the coating on the lens surface is rapidly hardened by internal heating and radiant catalysis.

The heat shock technique employs an intense beam of radiant energy forming a pulse of controlled duration. This pulse is preferentially absorbed in the coating, particularly when the coating contains absorbing media for a predetermined wavelength range of the radiant energy, which range is not absorbed by the substrate. When the pulse is of sufficiently short duration and the intensity of the radiant energy is sufficiently great, the total energy absorbed by the coating is sufficient to raise its temperature and substantially complete the hardening of the coating by reaction. This occurs before the heat has time to penetrate sufficiently into the substrate to raise the substrate temperature. At the end of the pulse the temperature of the coating is relatively high while the substrate is relatively cool. Also the substrate is relatively thick compared to the coating and, therefore, at the end of the pulse an average temperature is reached which is not high enough to distort the substrate.

For a coating of 0.0025 cm.² thick (1 mil) the following approximate formulae has been found to apply for the operation in accordance with the heat shock technique:

$E = It = 0.1$ to 10 gm. cals. depending on the radiation absorbence of the coating, in which $t$ is the pulse duration in seconds, and $I$ is the radiation intensity in gm. cals./cm.² sec. and $E$ is the total energy in gm. cals./cm.². Then $\alpha E$ is the total energy absorbed by the coating where $.01 < \alpha < 0.9$.

Having thus fully described the invention, what is claimed as new and desired to be secured by Letters Patent of the United States is:

1. A composition for producing upon drying a coating comprising a hard abrasion resistant film comprising from 3 to 50% of an organic reactive polymer selected from the group consisting of polyvinyl alcohol, polyvinyl alcohol acetate copolymer, polyvinyl formal, polyvinyl acetal, polyvinyl butyral, polyvinyl alcohol pyrrolidine copolymer, partially hydrolyzed copolymer of vinyl acetate and acrylonitrile and cellulose acetate, 30 to 94% of an inorganic reactive polymer selected from the group consisting of the polytitanates, polystannates, polygermanates, polyvanadates, polyzirconates, polysilicates and polyphosphates and from 3 to 40% of a monomer capable of reacting with the said organic and inorganic polymers selected from the group consisting of methyl methacrylate, acrylic acid, and allyl diglycol carbonate.

2. A composition according to claim 1 in which the inorganic polymer is a mixture of a polysilicate and from 5 to 10% of a polytitanate.

3. A composition for producing upon drying a hard surface coating film comprising 22 parts of an organic polymeric solution consisting of 20% cellulose acetate and 80% acetic acid, 73 parts of an inorganic polymeric solution consisting of 55% hydrolyzed tetraethyl orthosilicate (25% $SiO_2$) and 45% acetic acid and 5 parts of methyl methacrylate monomer.

4. A composition for producing upon drying a coating comprising a hard abrasion resistant film comprising 65 parts of an organic polymeric solution consisting of 6% polyvinyl acetaldehyde, 4% polyvinyl formal and 90% acetic acid, 25 parts of an inorganic polymeric solution containing hydrolyzed tetraethyl orthosilicate (25% $SiO_2$) and 10 parts 30% methyl methacrylate monomer in n-butanol.

5. A composition for producing upon drying a hard surface ultraviolet and infrared light absorbing film comprising 33.3 parts of a polyvinyl alcohol acetate copolymer solution consisting of 250 parts polyvinyl alcohol acetate copolymer, 225 parts ethanol, 225 parts n-propanol, and 300 parts distilled water, 33.3 parts of a silica solution consisting of 50 parts hydrolyzed tetraethyl orthosilicate (25% $SiO_2$) and 50 parts acetic acid, 31.9 parts of a 5% Naphthol Green B water solution, and 1.5 parts of allyl diglycol carbonate monomer.

6. A composition for producing upon drying a coating comprising a hard abrasion resistant film comprising from 3 to 50% of an organic reactive polymer selected from the group consisting of polyvinyl alcohol, polyvinyl alcohol acetate copolymer, polyvinyl formal, polyvinyl acetal, polyvinyl butyral, polyvinyl alcohol pyrrolidine copolymer, partially hydrolyzed copolymer of vinyl acetate and acrylonitrile and cellulose acetate, 30 to 94% of an inorganic reactive polymer in which the inorganic polymer is selected from the group consisting of the polytitanates, polysilicates, polystannates, polygermanates, polyvanadates, polyzirconates, and polyphosphates, and from 3 to 40% of a monomer capable of reacting with the said organic and inorganic polymers selected from the group consisting of methyl methacrylate, acrylic acid, and allyl diglycol carbonate.

7. A composition for producing upon drying a coating comprising a hard abrasion resistant film comprising from 3 to 50% of an organic reactive polymer selected from the group of polyvinyl alcohol, polyvinly alcohol acetate copolymer, polyvinyl formal, polyvinyl acetal, polyvinyl butyral, polyvinyl alcohol pyrrolidine copolymer, polyvinyl alcohol acrylonitrile copolymer and cellulose acetate, 30 to 94% of an inorganic reactive polymer selected from the group comprising polytitanates, polystannates, polygermanates, polyvanadates, polyzirconates and polyphosphates, and from 3 to 40% of an inorganic monomer capable of reacting with the said organic and inorganic polymers from the class consisting of the titanates, stannates, germanates, vanadates, zirconates and phosphates.

8. A composition for producing upon drying a hard surface ultraviolet and infrared light absorbing film comprising 33.3 parts of a polyvinyl alcohol acetate copolymer solution consisting of 250 parts polyvinyl alcohol acetate copolymer, 225 parts ethanol, 225 parts n-propanol, and 300 parts distilled water, 33.3 parts of a silica solution consisting of 50 parts hydrolyzed tetraethyl orthosilicate (25% $SiO_2$) and 50 parts acetic acid, 31.8 parts of a 5% Naphtol Green B water solution, the Naphthol Green B acting as a crosslinking agent as well as an optical band pass filter.

References Cited
UNITED STATES PATENTS

| | | | |
|---|---|---|---|
| 2,710,288 | 6/1955 | Hewson | 260—17 |
| 2,726,220 | 12/1955 | Ogden | 260—17 |
| 3,133,111 | 5/1964 | Wheeler | 260—448.8 |
| 3,143,561 | 8/1964 | Elam et al. | 260—448.8 |

WILLIAM H. SHORT, *Primary Examiner.*

J. NORRIS, *Assistant Examiner.*